(12) United States Patent
Lin

(10) Patent No.: US 6,560,287 B1
(45) Date of Patent: May 6, 2003

(54) SOURCE CODER AND ITS CODING METHOD

(75) Inventor: Rehn-Lieh Lin, Hsinchu Hsien (TW)

(73) Assignee: Winbond Electronics Corp., Hsinchu (TW)

(*) Notice: Subject to any disclaimer, the term of this patent is extended or adjusted under 35 U.S.C. 154(b) by 0 days.

(21) Appl. No.: 09/412,828

(22) Filed: Oct. 5, 1999

(30) Foreign Application Priority Data

Jan. 21, 1999 (TW) ........................................ 88100892 A

(51) Int. Cl.$^7$ ................................................. H04N 7/12
(52) U.S. Cl. ................................ 375/240.2; 348/409.1; 348/619
(58) Field of Search .......................... 348/409.1, 390.1, 348/397.1, 437.1, 597, 619; 375/240, 240.03, 240.2, 240.27

(56) References Cited

U.S. PATENT DOCUMENTS 5,796,436 A * 8/1998 Shioi et al. .................. 348/409

6,154,570 A * 11/2000 Boon ............................ 382/236

* cited by examiner

*Primary Examiner*—Chris Kelley
*Assistant Examiner*—George A Bugg
(74) *Attorney, Agent, or Firm*—Ladas & Parry

(57) ABSTRACT

A source coder for video, compression Of H.261 and H.263 is disclosed, including a subtracter, a coding circuit, a predicting circuit, a picture memory with motion compensated variable delay and a filter. The subtracter subtracts an input video frame by a previous predicted frame to obtain a difference. The coding circuit transforms and quantizes the difference to output a coded bit stream. The predicting circuit predicts an error from the coded bit stream. The adder adds the previous predicted frame by the error to output a new predicted frame. The picture memory stores the new compressed frame. The filter is selectively arranged after the picture memory to serve as a loop filter in H.261 mode and arranged before the subtracter to serve as a video-in filter in H.263 mode.

8 Claims, 3 Drawing Sheets

SOURCE CODER AND ITS CODING METHOD

BACKGROUND OF THE INVENTION

1. Field of the Invention

The present invention relates to a video compression method, and in particular, to a source coder and its coding method for video compression of H.261 and H.263, which uses a loop filter of H.261 as a video-in filter of H.263 to improve video quality and reduce bit stream size.

2. Description of the Related Art

FIG. 1 (Prior Art) is a block diagram showing a conventional video coder. As shown in FIG. 1, the video coder includes a video coder 10 and a video decoder 20 which are both controlled by a coding control circuit 30. The video coder 10 includes a source coder 12, a video multiplex coder 14, a transmission buffer 16 and a transmission coder 18. The video decoder 20 includes a source decoder 22, a video multiplex decoder 24, a receiving buffer 26 and a receiving decoder 28.

When source coding, an input video signal is coded by the source coder 12 to obtain an luminance and two color difference components. The output of the source coder 12 is then rearranged by the video multiplex coder 14 in hierarchical structure with four layers. From top to bottom these layers are: picture, group of blocks (GOB), macroblock (MB) and block. The output of the video multiplex coder 14 is then registered by the transmission buffer 16 and controlled by the transmission coder 18 to output a coded bit stream meeting requirements of the video decoder 20.

On the other hand, when source decoding, the coded bit stream is controlled by the receiving decoder 28 to meet requirements of the video coder 10. The output of the video decoder 28 is then registered in the receiving buffer 26, rearranged by the video multiplex decoder 24 and decoded by the source decoder 22 to output a corresponding video signal.

In this case, the source coder 12 is usually operated in H.261 mode and in H.263 mode.

FIG. 2A (Prior Art) is a block diagram showing a source coder of H.261. As shown in FIG. 2A, T represents a transformer of H.261, Q represents a quantizer of H.261, $Q^{-1}$ represents an inverse of the quantizer Q, $T^{-1}$ represents an inverse of the transformer T, P represents a picture memory with motion compensated variable delay and F represents a loop filter of H.261. In H.261 mode, the transformer T and the quantizer Q are used as a coding circuit of the source coder, and the inverse transformer $T^{-1}$ and the inverse quantizer $Q^{-1}$ are used as a predicting circuit of the source coder.

When video frames are sequentially input, an input video frame f is first subtracted using a subtracter by a previous predicted frame fp' which is stored in the picture memory P and filtered by the loop filter F to obtain a difference e. The difference e is then transformed and quantized by the transformer T and the quantizer Q to output a coded bit stream TQ(e). Meanwhile, the coded bit stream TQ(e) is also inverse quantized by the inverse quantizer $Q^{-1}$, inverse transformed by the inverse transformer $T^{-1}$ and added using an adder by the previous predicted frame fp' which is filtered by the loop filter F to output a new predicted frame stored in the picture memory P for the next source coding operation.

FIG. 2B (Prior Art) is a block diagram showing a source coder of H.263. As shown in FIG. 2B, T represents a transformer of H.263, Q represents a quantizer of H.263, $Q^{-1}$ represents an inverse of the quantizer Q, $T^{-1}$ represents an inverse of the transformer T and P represents a picture memory with motion compensated variable delay. In H.263 mode, the transformer T and the quantizer Q are used as a coding circuit of the source coder, and the inverse transformer $T^{-1}$ and the inverse quantizer $Q^{-1}$ are used as a predicting circuit of the source coder.

When video frames are sequentially input, an input video frame f is first subtracted using a subtracter by a previous predicted frame fp which is stored in the picture memory P to obtain a difference e. The difference e is then transformed by the transformer T and quantized by the quantizer Q to output a coded bit stream TQ(e). Meanwhile, the coded bit stream TQ (e) is also inverse quantized by the inverse quantizer $Q^{-1}$ and inverse transformed by the inverse transformer $T^{-1}$ and added using an adder by the previous predicted frame fp to obtain a new predicted frame stored in the picture memory P for the next source coding operation.

H.263 is a low-bit-rate video communication standard. However, goal of transmitting acceptable video quality in a limited communication channel remains. In order to achieve this goal, video frames obtained from the video-in channel must undergo extra filter processing. Accordingly, the source coder needs extra hardware (circuit and memory) and software, thus increasing the overall cost.

SUMMARY OF THE INVENTION

Therefore, the invention provides a source coder and its coding method, which uses a loop filter of H.261 as a video-in filter of H.263 so that the video quality can be improved and the bit stream size can be reduced without needing any extra hardware or increasing cost.

To realize the above and other objects, the present invention provides a source coder for video compression of H.261 and H.263. The source coder includes a subtracter, a coding circuit, a predicting circuit, a picture memory with motion compensated variable delay and a filter. The subtracter subtracts an input video frame by a previous predicted frame to obtain a difference. The coding circuit transforms and quantizes the difference to output a coded bit stream. The predicting circuit predicts an error from the coded bit stream. The adder adds the previous predicted frame by the error to output a new predicted frame. The picture memory stores the new compressed frame. The filter is selectively arranged after the picture memory to serve as a loop filter in H.261 mode and arranged before the subtracter to serve as a video-in filter in H.263 mode.

Because the video-in filter can smooth the video in Data, reduce the effect of motion estimation, so the video quality can be implemented and the size of the obtained bit stream can be reduced.

Further, in the source coder for video compression of H.261 and H.263 according to the present invention, the coding circuit is constructed with a transformer and a quantizer. The transformer transforms the difference. The quantizer quantizes the transformed difference to obtain the coded bit stream.

Further, in the source coder for video compression of H.261 and H.263 according to the present invention, the predicting circuit is constructed with an inverse quantizer and an inverse transformer. The inverse quantizer inverse quantizes the coded bit stream. The inverse transformer inverse transforms the inverse quantized bit stream to obtain the error.

Further, in the source coder for video compression of H.261 and H.263 according to the present invention, the picture memory is constructed with a register to store the generated predicted frame.

To realize the above and other objects, the present invention also provides a source coding method for video compression of H.261 and H.263. According to this method, an input video frame is first subtracted by a previous predicted frame to obtain a difference. The difference is then coded (transformed and quantized) by a coding circuit to output a coded bit stream. Meanwhile, the coded bit stream is also decoded (inverse quantized and inverse transformed) by a predicting circuit to predict an error. The error is then added by the previous predicted frame to generate a new predicted frame which is stored in a picture memory with motion compensated variable delay. Further, to improve the video quality and reduce the bit stream size, a filter is also selectively arranged after the picture memory to serve as a loop filter of H.261 and arranged before the subtracter to serve as a video-in filter of H.263.

BRIEF DESCRIPTION OF THE DRAWINGS

Further objects, features and advantages of the present invention will become apparent from the following detailed description of a preferred embodiment of the invention with reference to the accompanying drawings.

DETAILED DESCRIPTION OF THE PREFERRED EMBODIMENT

H.261 and H.263 share the same coding mechanism, except for the bit stream syntax, coding tables and the loop filter of H.261. Therefore, if the loop filter of H.261 can be used as the video-in filter of H.263, the video quality can be greatly improved and the bit stream size can be further reduced without adding any extra circuits and increasing cost.

Figure 1:
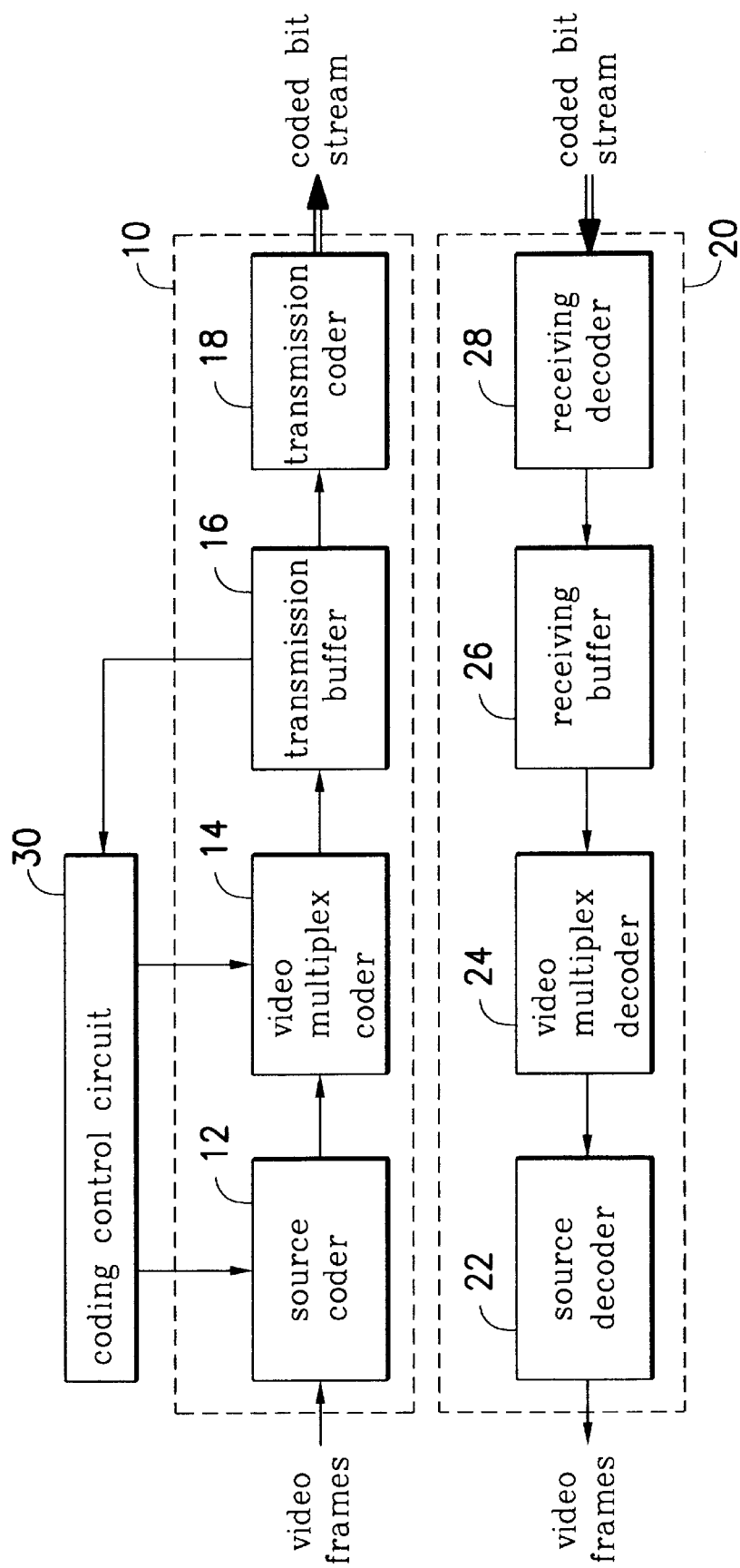
FIG. 1 (Prior Art) is a block diagram showing a video coder.
Figure 2A:
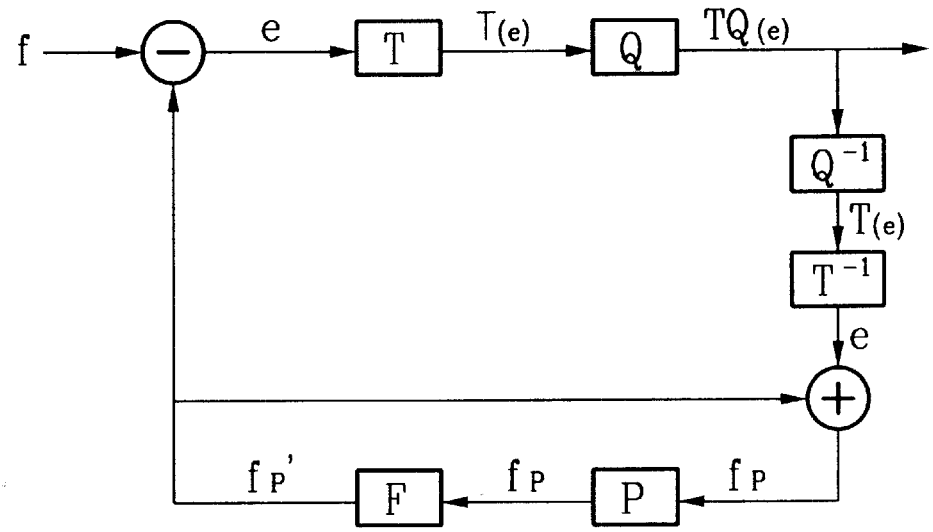
FIG. 2A (Prior Art) is a block diagram showing a source coder of H.261.

According to the present invention, when source coding in H.261 mode, the source coder and its coding method are exactly the same as those shown in FIG. 2A. That is to say, when video frames are sequentially input, an input video frame f is first subtracted using a subtracter by a previous predicted frame fp' which is stored in the picture memory P and filtered by the loop filter F to obtain a difference e. The difference e is then transformed and quantized by the transformer T and the quantizer Q to output a coded bit stream TQ(e). Meanwhile, the coded bit stream TQ(e) is also inverse quantized by the inverse quantizer $Q^{-1}$, inverse transformed by the inverse transformer $T^{-1}$ and added using an adder by the previous predicted frame fp' which is filtered by the loop filter F to output a new predicted frame stored in the picture memory P for the next source coding operation.

Figure 2B:
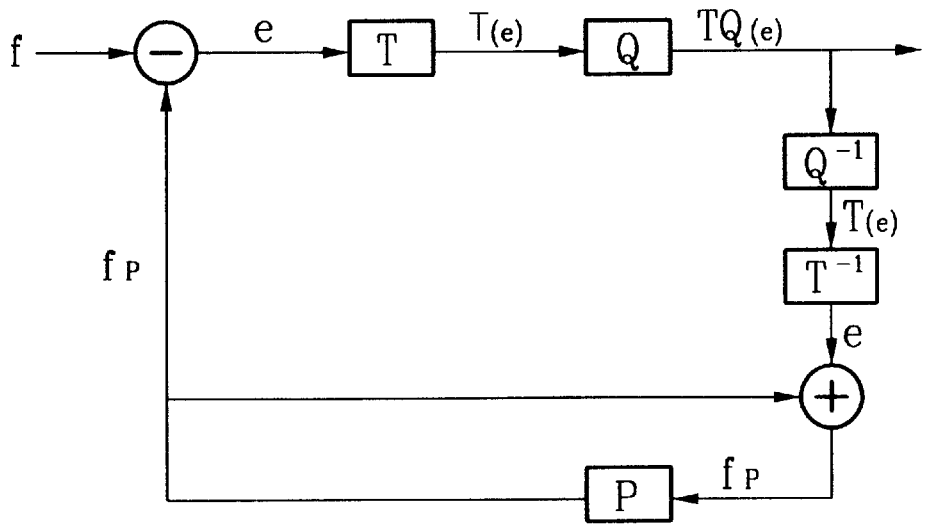
FIG. 2B (Prior Art) is a block diagram showing a source coder of H.263.
Figure 3:
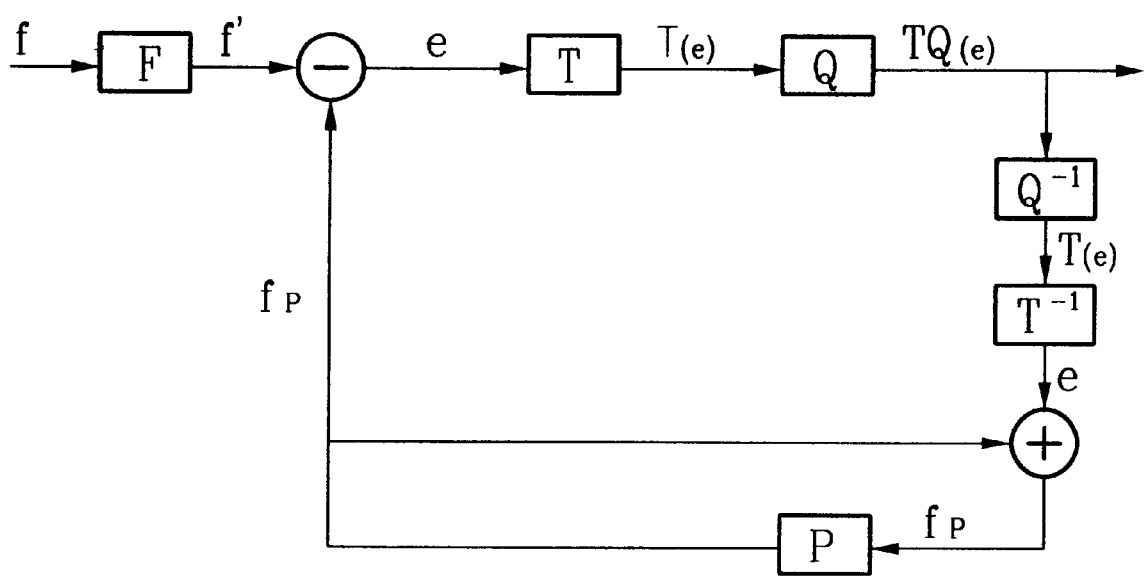
FIG. 3 is a block diagram showing a source coder of H.263 according to the present invention.

However, when source coding in H.263 mode, the source coder and its coding method are different from those shown in FIG. 2B. FIG. 3 is a diagram showing a source coder of H.263 according to the present invention.

As in as FIG. 2B, T represents a transformer of H.263, Q represents a quantizer of H.263, $Q^{-1}$ represents an inverse of the quantizer Q, $T^{-1}$ represents an inverse of the transformer T and P represents a picture memory with motion compensated variable delay. In H.263 mode, the transformer T and the quantizer Q are used as a coding circuit of the source coder, and the inverse quantizer $Q^{-1}$ and the inverse transformer $T^{-1}$ are used as a predicting circuit of the source coder.

In contrast to FIG. 2B, in H.263 mode, the loop filter F (as shown in FIG. 2A) is arranged before the adder so that the input video frame f from a video-in channel can be pre-filtered to obtain a filtered video frame f' which is then subtracted by the previous predicted frame fp.

Therefore, when video frames are sequentially input, an input video frame f is first pre-filtered by the loop filter F of H.261 to obtained a filtered video frame f'. The filtered video frame f' is then subtracted using a subtracter by a previous predicted frame fp which is stored in the picture memory P to obtain a difference e. Thereafter, the difference e is transformed by the transformer T and quantized by the quantizer Q to output a coded bit stream TQ(e). Meanwhile, the coded bit stream TQ(e) is also inverse quantized by the inverse quantizer $Q^{-1}$ and inverse transformed by the inverse transformer $T^{-1}$ and added using an adder by the previous predicted frame fp to obtain a new predicted frame stored in the picture memory P for the next source coding operation.

Summing up the above, the source coder and its coding method according to the present invention can greatly improve the video quality and further reduce the bit stream size by using the loop filter of H.261 as the video-in filter of H.263. Further, the video quality can be improved and the bit stream size can be reduced without needing any extra hardware or further cost.

It should be understood that the present invention is not limited to the preferred embodiment as disclosed above. Variations and modifications can be made by those who are skillful in the art without departing from the spirit and scope of the present invention as defined in the appended claims. Thus, this invention is not to be limited to the disclosed embodiment except as required by the appended claims.

What is claimed is:

1. A source coder for video compression of H.261 and H.263, comprising:

a subtracter for subtracting an input video frame by a previous predicted frame to obtain a difference;

a coding circuit for transforming and quantizing the difference to output a coded bit stream;

a predicting circuit for predicting an error from the coded bit stream;

an adder for adding the previous predicted frame by the error to output a new predicted frame;

a picture memory for storing the new predicted frame; and a filter selectively arranged after the picture memory to serve as a loop filter in H.261 mode and arranged before the subtracter to serve as a video-in filter in H.263 mode.

2. The source coder for video compression of H.261 and H.263 as claimed in claim 1, wherein the coding circuit comprises:

a transformer transforming the difference; and a quantizer quantizing the transformed difference to obtain the coded bit stream.

3. The source coder for video compression of H.261 and H.263 as claimed in claim 1, wherein the predicting circuit comprises:

an inverse quantizer for inverse quantizing the coded bit stream; and an inverse transformer for inverse transforming the inverse quantized bit stream to obtain the error.

4. The source coder for video compression of H.261 and H.263 as claimed in claim 1, wherein the picture memory is constructed with a register for storing the new predicted frame.

5. A source coding method for video compression of H.261 and H.263, comprising the steps of:

subtracting an input video frame by a previous predicted frame to obtain a difference;

providing a coding circuit to transform and quantize the difference to output a coded bit stream;

providing a predicting circuit to predict an error from the coded bit stream;

adding the previous predicted frame by the error to generate a new predicted frame;

providing a picture memory with motion compensated variable delay to store the new predicted frame; and providing a filter selectively arranged after the picture memory to serve as a loop filter of H.261 and arranged before the subtracter to serve as a video-in filter of H.263.

6. The coding method for video compression of H.261 and H.263 as claimed in claim 5, wherein the coding circuit comprises:

a transformer transforming the difference; and a quantizer quantizing the transformed difference to obtain the coded bit stream.

7. The coding method for video compression of H.261 and H.263 as claimed in claim 5, wherein the predicting circuit comprises:

an inverse quantizer for inverse quantizing the coded bit stream; and an inverse transformer for inverse transforming the inverse quantized bit stream to obtain the error.

8. The coding method for video compression of H.261 and H.263 as claimed in claim 5, wherein the picture memory is constructed with a register for storing the new predicted frame.

* * * * *